No. 665,333. Patented Jan. 1, 1901.
D. LIPPY.
SEPARATOR.
(Application filed June 20, 1900.)
(No Model.)
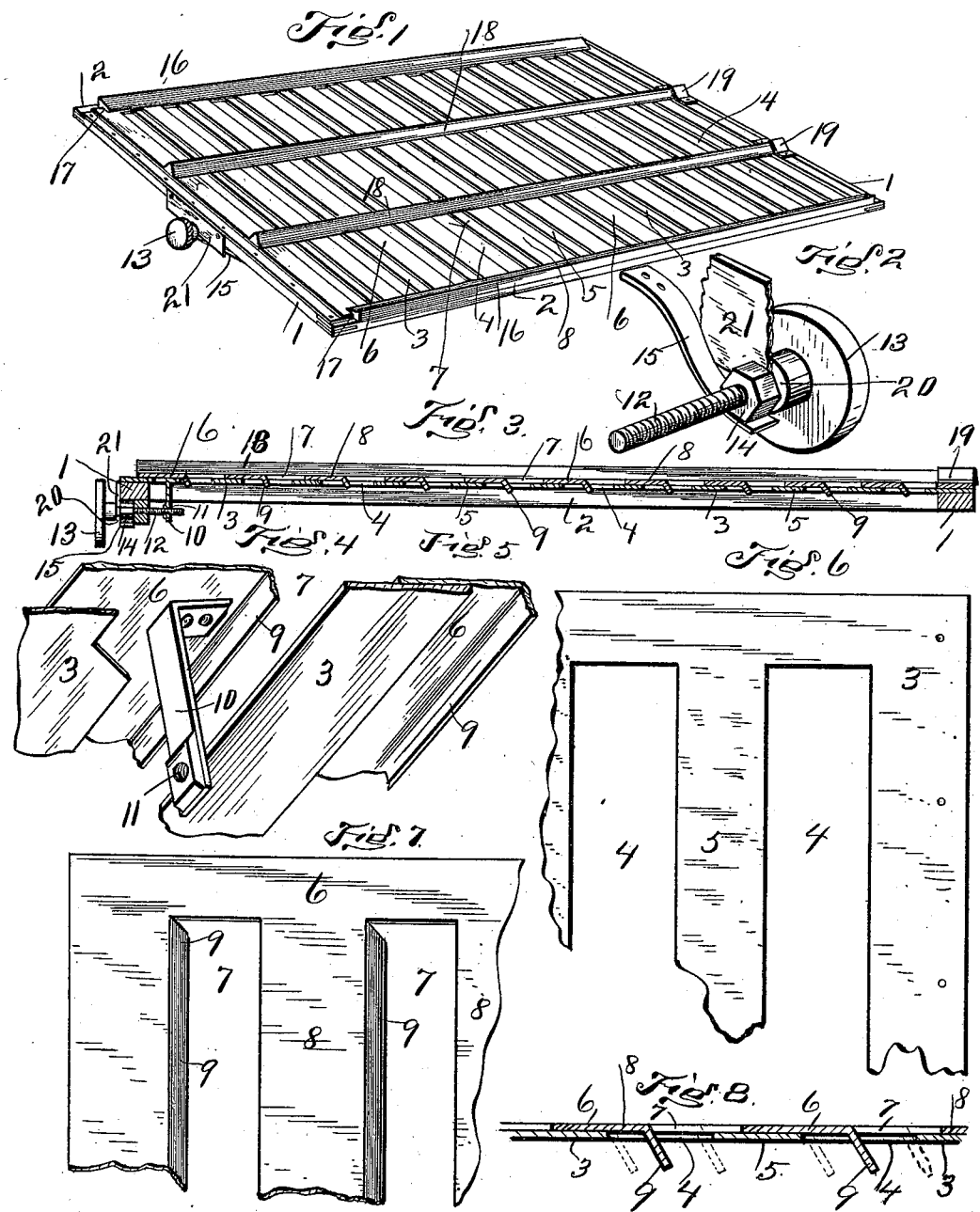
Witnesses:
G. J. Cross
J. R. Bond
Inventor
David Lippy
By F. W. Bond
Atty.

UNITED STATES PATENT OFFICE.

DAVID LIPPY, OF MANSFIELD, OHIO, ASSIGNOR TO THE LIPPY MANUFACTURING COMPANY, OF SAME PLACE.

SEPARATOR.

SPECIFICATION forming part of Letters Patent No. 665,333, dated January 1, 1901.

Application filed June 20, 1900. Serial No. 20,923. (No model.)

*To all whom it may concern:*

Be it known that I, DAVID LIPPY, a citizen of the United States, residing at Mansfield, in the county of Richland and State of Ohio, have invented certain new and useful Improvements in Separators; and I do hereby declare that the following is a full, clear, and exact description of the same, reference being had to the annexed drawings, making a part of this specification, and to the figures of reference marked thereon, in which—

Figure 1 is a perspective view. Fig. 2 is a view showing the separator-adjusting shaft, its knob, and spring. Fig. 3 is a longitudinal section. Fig. 4 is a view showing a portion of one of the upper slats and the adjusting-bar connected thereto. Fig. 5 is a view showing a portion of one of the fixed slats and illustrating one of the adjustable slats located thereon. Fig. 6 is a view showing a portion of the lower or fixed slat-section. Fig. 7 is a view showing a portion of the upper or sliding section. Fig. 8 is an enlarged view showing the fixed and removable sections in proper relative position.

The present invention has relation to separators; and it consists in the different parts and combinations of parts hereinafter described, and particularly pointed out in the claim.

Similar numerals of reference indicate corresponding parts in all the figures of the drawings.

In the accompanying drawings, 1 represents the end members of the frame, and 2 the side members thereof, said members being connected together, so as to produce a rectangular frame.

To the frame proper is attached the stationary or fixed plate 3, which plate is formed of a size to correspond with the size of the frame and is provided with the transverse cut-out portions or openings 4, which openings are formed of any desired width, reference being had to the capacity of the separator. The plate 3 is provided with the openings 4, said openings being spaced from each other and the bars 5 located between the openings, said bars 5 being formed integral with the plate, or, in other words, the plate and bars constitute an entire and complete structure or sheet, which is fixed to the frame.

Upon the upper side of the plate 3 is located the adjustable plate 6, which adjustable plate is provided with the openings 7, which openings extend transversely across the separator and are formed of a size to correspond, substantially, with the size of the openings 4.

For the purpose hereinafter described the forward edges of the transverse bars 8, located between the openings 7, are provided with the downturned flanges 9, which flanges are left integral with the cross-bars 8 and are extended through the openings 4, formed in the plate 3, substantially as illustrated in Figs. 3 and 8.

For the purpose of adjusting the plate 6 back and forth upon the plate 3 the plate 6 is provided with the downward-extending arm 10, which extending arm is provided with the screw-threaded aperture 11, through which screw-threaded aperture is located the screw-threaded shaft 12, which screw-threaded shaft is provided with the knob 13 and the angle-faced disk 14, and for the purpose of preventing the screw-threaded shaft 12 from rotating accidentally the spring 15 is provided, which spring is so arranged that it will press or bear against one of the faces of the angle-faced disk 14 and is connected to one of the end members 1 or its equivalent.

When it is desired to close the separator, the knob 13 is rotated, which in turn rotates the screw-threaded shaft 12, thereby moving the plate 6 so as to bring the bars 8 over the openings 4 in the fixed plate 3.

When it is desired to adjust the separator proper for different kinds of grain, the knob 14 is rotated in the direction to bring the cross-bars 8 over the bars 5, by which arrangement openings are provided for the passage of grain.

The object and purpose of providing the downturned flanges 9 is to cause the blast of wind to move upward through the openings 4 and 7, thereby lifting the chaff and unfilled kernels of grain, by which arrangement a complete separation of the grain from the chaff and unfilled kernels of grain is brought about.

It will be understood that when it is desired to separate fine seed or grain, such as timothy-seed, flax, or clover, the upper plate 6 should be so adjusted that but a fine or small opening is provided, by which arrangement a small blast of wind is passed through the opening, thereby allowing the lighter grades of seed and grain to be separated from the chaff. It will be understood that for coarser and heavier grain a wider opening is necessary and a heavier blast is also required to produce proper separation; but by my peculiar arrangement I am enabled to regulate the degree of blast through the opening by regulating the spaces through which the grain must fall to be separated from the chaff.

In the separation of grain of various kinds passage must be made for different degrees of dampness, and by my peculiar arrangement I am also enabled to vary the blast, so as to produce perfect separation, regardless of the condition of the straw and chaff from which the grain is to be separated.

For the purpose of holding the upper sheet 6 in proper contact with the plate 3 the ribs 16 are provided, which ribs are provided with grooves or cut-out portions 17, thereby providing a means for holding the upper or movable sheet 6 in proper relation with reference to the fixed plate or sheet 3.

For the purpose of preventing the bars 8 from springing the longitudinal bars 18 are provided, which longitudinal bars are connected to the transverse bars 8 in any convenient and well-known manner.

For the purpose of holding the bars 18 at their forward ends the caps 19 are provided, which caps are fixed to the forward end bar 1 in any convenient and well-known manner.

In the drawings I have shown two bars 18; but it will be understood that a greater or less number may be employed without departing from the nature of my invention, as the only object to be accomplished is to prevent the upper plate and its bars from springing or bending during the time it is adjusted, as it will be understood that the movable plate should be seated snugly to the fixed plate at all times and under all circumstances.

It will be understood that the screw-threaded shaft 12 should be held against longitudinal movement during the time it is rotated, and in order to prevent any longitudinal movement a groove, such as 20, is provided and in which groove is seated the plate 21, said plate being fixed to one of the end members 1.

Having fully described my invention, what I claim as new, and desire to secure by Letters Patent, is—

In a separator of the class described, a rectangular frame, a plate having a series of cross-bars 5 connected in fixed position upon the frame, openings 4 located in the plate between the said cross-bars, an adjustable plate consisting of cross-bars formed of a length to correspond with the width of the frame, said cross-bars provided with downturned flanges extended through the openings 4, and means for adjusting the plate, substantially as and for the purpose set forth.

In testimony that I claim the above I have hereunto subscribed my name in the presence of two witnesses.

DAVID LIPPY.

Witnesses:
  JAS. J. MAGUIRE,
  DANL. W. FOLEY.